US008804789B2

(12) United States Patent
Subramanian

(10) Patent No.: US 8,804,789 B2
(45) Date of Patent: *Aug. 12, 2014

(54) CONFIGURABLE MULTIMODE DESPREADER FOR SPREAD SPECTRUM APPLICATIONS

(75) Inventor: Ravi Subramanian, Mountain View, CA (US)

(73) Assignee: Infineon Technologies AG, Neubiberg (DE)

( * ) Notice: Subject to any disclaimer, the term of this patent is extended or adjusted under 35 U.S.C. 154(b) by 0 days.

This patent is subject to a terminal disclaimer.

(21) Appl. No.: 11/179,356

(22) Filed: Jul. 11, 2005

(65) Prior Publication Data

US 2006/0013286 A1   Jan. 19, 2006

Related U.S. Application Data

(63) Continuation of application No. 09/751,785, filed on Dec. 29, 2000, now Pat. No. 6,934,319.

(60) Provisional application No. 60/173,634, filed on Dec. 30, 1999.

(51) Int. Cl.
H04L 27/30 (2006.01)

(52) U.S. Cl.
USPC ........... 375/142; 375/144; 375/148; 375/150; 375/343; 375/351

(58) Field of Classification Search
USPC ......... 375/142–144, 148, 150, 152, 285, 343, 375/351, 369; 370/320, 335, 342, 441, 479; 708/422

See application file for complete search history.

(56) References Cited

U.S. PATENT DOCUMENTS

| 4,583,048 | A | | 4/1986 | Gumacos et al. |
|---|---|---|---|---|
| 5,136,612 | A | | 8/1992 | Bi |
| 5,237,586 | A | * | 8/1993 | Bottomley ............... 370/206 |
| 5,640,386 | A | | 6/1997 | Wiedeman |
| 5,659,574 | A | | 8/1997 | Durrant et al. |
| 5,689,526 | A | | 11/1997 | Slonneger et al. |
| 6,005,887 | A | | 12/1999 | Bottomley et al. |
| 6,088,384 | A | | 7/2000 | Hindman |
| 6,198,763 | B1 | * | 3/2001 | Inoue et al. ............... 375/130 |
| 6,266,365 | B1 | | 7/2001 | Wang et al. |
| 6,363,108 | B1 | | 3/2002 | Agrawal et al. |
| 6,370,130 | B1 | | 4/2002 | Zhou et al. |
| 6,470,000 | B1 | * | 10/2002 | Burns et al. ............... 370/342 |
| 6,631,173 | B1 | * | 10/2003 | Siirtola et al. ............ 375/343 |
| 7,154,972 | B2 | * | 12/2006 | Roy et al. ................. 375/350 |

OTHER PUBLICATIONS

Underbrink et al. (US Patent Publication—US2005/0025222)—System and Method for Despreading in a Spread Spectrum Matched Filter.*

* cited by examiner

*Primary Examiner* — Dac Ha
(74) *Attorney, Agent, or Firm* — Schiff Hardin LLP

(57) ABSTRACT

A configurable multimode despreader for spread spectrum applications is disclosed herein. The despreader includes a plurality of data lines, at least one selective coupler coupled to the plurality of data lines, at least one multiplier coupled to the selective coupler, and a code input line coupled to the multiplier. The selective coupler selectively couples one of the plurality of data lines with the multiplier per any one of a plurality of despreading protocols. The multiplier then multiplies a desired input data type received from the selective coupler with a despreading code chip received from the code input line to produce an observation. The programmable multimode despreader supports variable code and data modulation schemes and variable spreading factors.

5 Claims, 7 Drawing Sheets

CONFIGURABLE MULTIMODE DESPREADER FOR SPREAD SPECTRUM APPLICATIONS

CROSS-REFERENCE TO RELATED APPLICATIONS

This application is a continuation of application Ser. No. 09/751,785, filed Dec. 29, 2000, now U.S. Pat. No. 6,934,319.

This application claims priority to the provisional patent application with the following Ser. No. 60/173,634, filed on Dec. 30, 1999.

Related applications, which are incorporated herein by reference, are:
A CONFIGURABLE ALL-DIGITAL COHERENT DEMODULATOR SYSTEM FOR SPREAD SPECTRUM APPLICATIONS,
Ser. No. 09/751,783, now U.S. Pat. No. 7,010,061.
APPARATUS AND METHOD FOR CALCULATING AND IMPLEMENTING A FIBONACCI MASK FOR A CODE GENERATOR,
Ser. No. 09/751,776, now U.S. Pat. No. 6,947,468.
A FAST INITIAL ACQUISITION & SEARCH DEVICE FOR A SPREAD SPECTRUM COMMUNICATION SYSTEM,
Ser. No. 09/751,777.
A CONFIGURABLE CODE GENERATOR SYSTEM FOR SPREAD SPECTRUM APPLICATIONS,
Ser. No. 09/751,782, now U.S. Pat. No. 7,031,376.
METHOD AND APPARATUS TO SUPPORT MULTI STANDARD, MULTI SERVICE BASE-STATIONS FOR WIRELESS VOICE AND DATA NETWORKS,
Ser. No. 09/752,050.
IMPROVED APPARATUS AND METHOD FOR MULTI-THREADED SIGNAL PROCESSING Ser. No. 09/492,634, filed on Jan. 27, 2000, now U.S. Pat. No. 6,967,999.
Except for application Ser. No. 09/492,634, all of the above applications are filed simultaneously herewith.

TECHNICAL FIELD

The present claimed invention relates to the field of wireless communication. In particular, the present claimed invention relates to an apparatus and a method for despreading digital spread-spectrum signals in a wireless communication system.

BACKGROUND ART

Wireless communication has extensive applications in consumer and business markets. Among the many communication applications/systems are: fixed wireless, unlicensed (FCC) wireless, local area network (LAN), cordless telephony, personal base station, telemetry, mobile wireless, and other digital data processing applications. While each of these applications utilizes spread spectrum communications, they generally utilize unique and incompatible spreading protocols for signal transmissions. This corresponds to unique despreading protocols and algorithms for receiving the signals. Consequently, each application may require unique hardware, software, and methodologies for despreading. This practice can be costly in terms of design, testing, manufacturing, and infrastructure resources. As a result, a need arises to overcome the limitations associated with the varied hardware, software, and methodology of despreading digital signals for each of the varied wireless applications.

Complete demodulation of the radio waveform requires that the signal be processed by a specific step referred to as 'despreading.' The channel codes utilized for despreading relate to the complexity of the radio receiver design and channel width of the transmission. As new generations of protocols and hardware arise in any of the varied applications, they are sometimes sufficiently different from the previous generation as to render legacy systems incompatible or unusable. This situation arises from the equipment that has been developed using a standard-centric perspective. Consequently, new software, hardware, or infrastructure may be required to accommodate a new protocol in a given despreader application. Again, this practice can be costly in terms of design, testing, manufacturing, and infrastructure resources. Consequently, a need arises to overcome the lack of backward and forward compatibility associated with new generations of despreading protocols, hardware, and infrastructure within any of the varied wireless applications.

A despreader is a component used in spread-spectrum wireless communication receivers as a subsystem required to detect a signal. A despreader receives a spread spectrum data signal and performs inner-product operations with known despreading code sequences to despread the signal and form a symbol. One significant performance barrier in any communication system is the degradation of a data signal due to noise. A despreader accumulates signal energy as part of the overall despreader function. However, a noise or interference portion of a received signal can affect the resulting detection statistic, e.g., symbol, of the data signal generated by the despreader. Furthermore, variations in spreading factors are also used to accommodate multiple data rate transmission. Thus, a need arises to overcome limitations of noise and interference portions of the data signal. In addition, a need arises for a method to overcome the limitations associated with the variations and incompatibility of different spreading factors used to spread a signal at a transmitter device.

Unfortunately, the noise and interference portion of a data signal is frequently unstable. That is, the noise level in a signal can vary widely over time in a real-world environment. For example, weather, geographical interferences, electromagnetic interferences, distance between a base station and a mobile handset, speed of a mobile handset, transmissions from other users, etc. can contribute to the variation in the noise levels. If an accumulation length is selected for one noise condition, it may not be efficient for another noise condition. Thus, a need arises for a method to perform despreading functions that overcome the limitations of variation in the noise level of a signal under different operating environments.

SUMMARY OF THE INVENTION

The present invention provides a solution to the limitations of varied hardware, software, and methodology of despreading/descrambling digital signals in each of the varied wireless applications. The present invention also provides a solution to conventional limitations of backward and forward compatibility associated with new generations of spreading and channelization protocols, hardware, and infrastructure within any of the varied wireless applications. Furthermore, the present invention provides alternatives to the limitations of noise and interference with despreading. The present invention also overcomes the limitations associated with the variations and incompatibility of different spreading factors used to spread a signal at a transmitter device. Lastly, the present invention accomplishes these items while addressing variations in the noise level of a signal under different operating environments.

In particular, the present invention provides a configurable multimode despreader. The despreader includes a plurality of data lines, at least one selective coupler coupled to the plurality of data lines, at least one multiplier coupled to the selective coupler, and a code input line coupled to the multiplier. The selective coupler selectively couples one of the plurality of data lines with the multiplier per any one of a plurality of despreading protocols. The multiplier then multiplies a desired input data type received from the selective coupler with a despreading code chip received from the code input line to produce an observation.

A second embodiment of the present invention provides a despreader having accumulate and dump circuits with a variable observation length for processing digital data. The despreader includes at least one multiplier and at least one accumulate and dump circuit coupled to the multiplier. The multiplier multiplies an input data sample with a despreading code chip. The despreader also includes an additional multiplier, an additional accumulate and dump circuit, and an interface. The interface is coupled to the first accumulate and dump circuit and the additional accumulate and dump circuit. Both accumulate and dump circuits have an enable input that selectively dumps an accumulated result after a variable observation period (e.g., quantity of accumulate operations) has occurred. The interface has an enable input that allows it to add the results from the first accumulate and dump circuit and the additional accumulate and dump circuit and outputs the result. A memory coupled to both accumulate and dump circuits and the interface circuit, provides a value that dictates the observation period of the accumulate and dump circuit and the additional accumulate and dump circuit. In view of both embodiments, the programmable multimode despreader supports variable code and data modulation schemes and variable spreading factors.

These and other objects and advantages of the present invention will become apparent to those of ordinary skill in the art after having read the following detailed description of the preferred embodiments, which are also illustrated in the various drawing figures.

BRIEF DESCRIPTION OF THE DRAWINGS

The drawings included herewith are incorporated in and form a part of this specification. The drawings illustrate embodiments of the invention and, together with the description, serve to explain the principles of the invention. It should be understood that the drawings referred to in this description are not drawn to scale unless specifically noted as such.

DETAILED DESCRIPTION OF THE INVENTION

Figure 1:
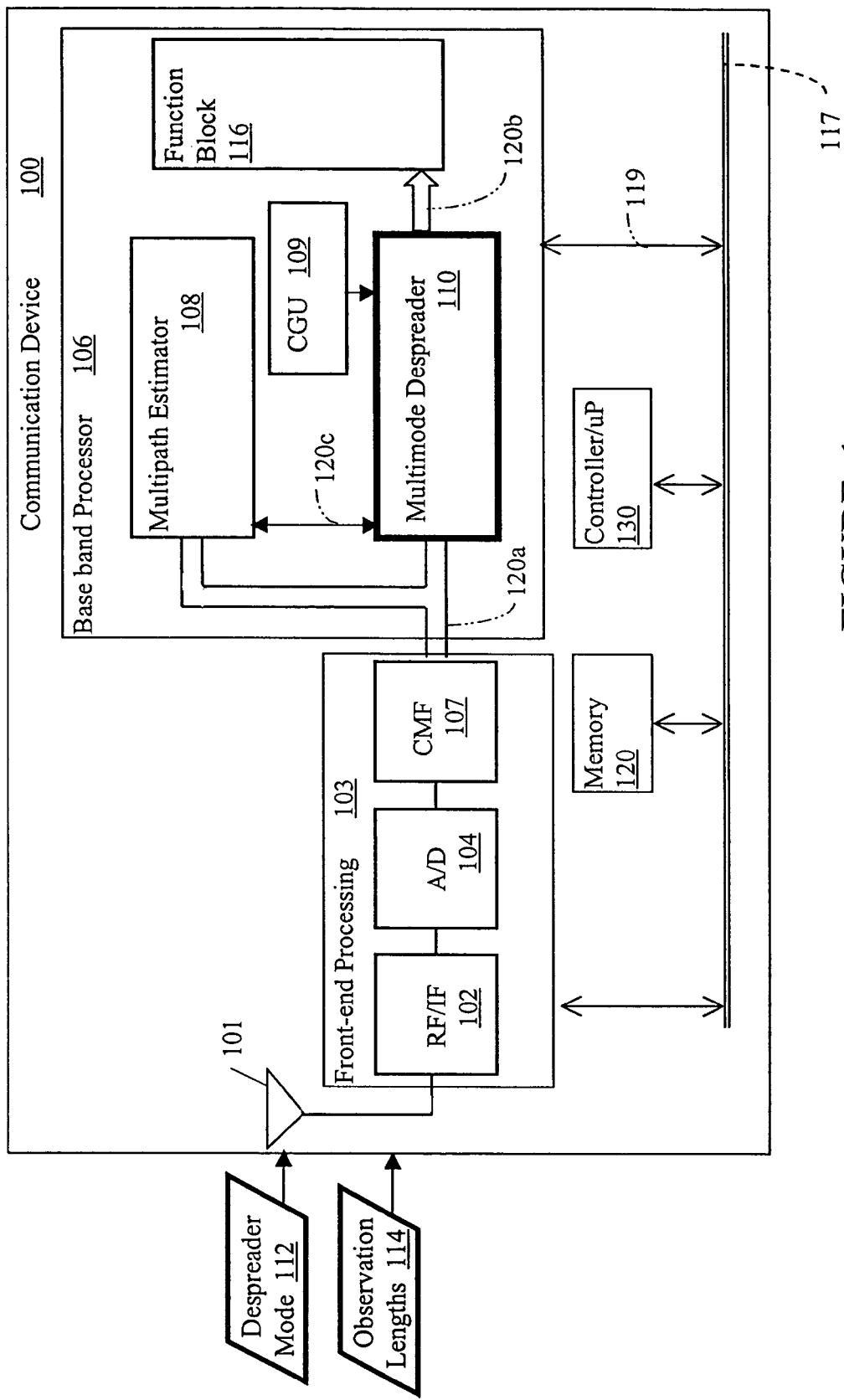
FIG. 1 is a block diagram of an electronic communication device having a multimode despreader, in accordance with one embodiment of the present invention.

Reference will now be made in detail to the preferred embodiments of the invention. Examples of the preferred embodiment are illustrated in the accompanying drawings. While the invention will be described in conjunction with the preferred embodiments, it is understood that they are not intended to limit the invention to these embodiments. Rather, the invention is intended to cover alternatives, modifications and equivalents, which may be included within the spirit and scope of the invention, as defined by the appended claims. Additionally, in the following detailed description of the present invention, numerous specific details are set forth in order to provide a thorough understanding of the present invention. However, it will be apparent to one of ordinary skill in the art that the present invention may be practiced without these specific details. In other instances, well-known methods, procedures, components, and circuits have not been described in detail so as not to unnecessarily obscure aspects of the present invention.

The present invention can be implemented in a wide variety of digital spread-spectrum wireless communication systems or techniques. These systems or techniques include, but are not limited to, fixed wireless, unlicensed Federal Communications Commission (FCC) wireless systems, wireless local area network (W-LAN), cordless telephony, cellular telephony, personal base station, telemetry, and other digital data processing applications. The present invention can be applied to both transmitters, e.g., a base station, and to receivers, e.g., a terminal, for fixed wireless, W-LAN, cellular telephony, and personal base station applications.

In particular, one fixed wireless application to which the present invention may be applied is a metropolitan multipoint distribution system (MMDS). Examples include wireless cable broadcast, or two-way wireless local loop (WLL) systems. Some examples of a W-LAN, that can communicates digitized audio and data packets, for which the present invention can be applied include Open Air, and the Institute of Electrical and Electronics Engineers (IEEE) specification 802.11b. And in the application of unlicensed FCC applications, the present invention may be applied to specific instances such as the Industrial, Scientific, and Medical band (ISM) devices, which can include cordless telephony products. Personal base stations can utilize either cordless or cellular telephony wireless communication standards. Lastly, the cellular telephony systems in which the present invention can be applied includes, but is not limited to, IS-95, IS2000, ARIB, 3GPP-FDD, 3GPP-TDD, 3GPP2, 1EXTREME, or other user-defined protocols. The range of modulation techniques that are utilized in the exemplary spread spectrum applications disclosed herein, are useful to define the class of functions for which the present configurable all-digital coherent demodulator is applicable.

The detailed description of the present invention begins with a description of a communication device, in FIG. 1A in which a configurable multimode despreader is implemented. Then, the detailed description section will continue with details of the physical structure and architecture of the components of the configurable despreader, in FIGS. 2A-3. A functional diagram in FIG. 4 provides exemplary variables upon which integration lengths may be evaluated. Lastly, the detailed description section will describe, in FIGS. 5A-5B, various processes associated with the configurable despreader using exemplary flowcharts.

Communication Device

Referring now to FIG. 1, a block diagram of an electronic communication device having a multimode despreader is shown, in accordance with one embodiment of the present invention. Electronic communication device 100 is a wireless code division multiple access (CDMA) base station in the present embodiment, e.g., cellular telephony. However, the present invention is well suited to use in a mobile handset, a test platform, an embedded wireless modem, or other communication device. Furthermore, the present invention is applicable to any electronic device needing to despread a data signal. Communication device 100 is operable as described in a subsequent flowchart.

Communication device 100 includes a front-end processing block 103 having an antennae 101 coupled to a radio frequency/intermediate frequency (RF/IF) transceiver 102. RF/IF transceiver 102 includes components such as a voltage-controlled oscillator (VCO) and amplification devices, known to one skilled in the art, for performing signal mixing, filtering and gain control functions. In turn the RF transceiver 102 is coupled to an analog to digital (A/D) converter 104 that digitizes the analog signal from the RF transceiver 102 into a digital signal in a reception path. A/D converter 104 is coupled to a chip-matched filter (CMF) 107 that filters the signal in a manner suitable for subsequent processing in a multimode despreader 110. The output of CMF 107 can be a complex signal, which is represented by the wide interconnect 120a. Communication device 100 also includes memory 120 and a processor uP (or controller) 130, coupled to a bus 117, to provide data and instructions to the various components shown.

Base band processor 106, which is operable to process the recovered digital signal delivered by a source following front-end processing operations, includes components such as a multimode despreader 110, a multipath estimator 108, a code generator unit (CGU) 109, and a function block 116. Multipath estimator 108 and CGU 109 are coupled to multimode despreader 110 in parallel. Function block 116 is coupled to receive the output of multimode despreader 110. It is appreciated that estimator 108 perform functions such as channel estimation, and that function block 116 performs signal processing operations, such as decoding, that are known to those skilled in the art. Multimode despreader 110 is capable of despreading a complex signal and providing a complex despread signal, represented by wide interconnect 120b. Multipath estimator communicates estimation results with multimode despreader via line 120c.

In one embodiment, multiple physical instances of multimode despreader 110 can be utilized in communication device 100 to accommodate multiple input channels in order to realize a rake receiver, or to process multiple fingers. Alternatively, multimode despreader 110 is capable of providing multiple virtual despreading functional planes to accommodate this same goal. Multimode despreader 110 can also be used for multiple despreading fingers. This can be realized via a multi-threaded, time-shared architecture that utilizes dynamic resource allocation and scheduling.

CGU 109 provides the despreading codes necessary for processing the spread signal. In one embodiment, CGU 109 is configurable to provide one of the many despreading codes, e.g., long or short codes, that are capable of being implanted in programmable multimode despreader 110. Additional detail on the configurable code generator is provided in the above-referenced co-pending U.S. patent application Ser. No. 09/751,782, entitled "A CONFIGURABLE CODE GENERATOR SYSTEM FOR SPREAD SPECTRUM APPLICATIONS".

Figure 2A:
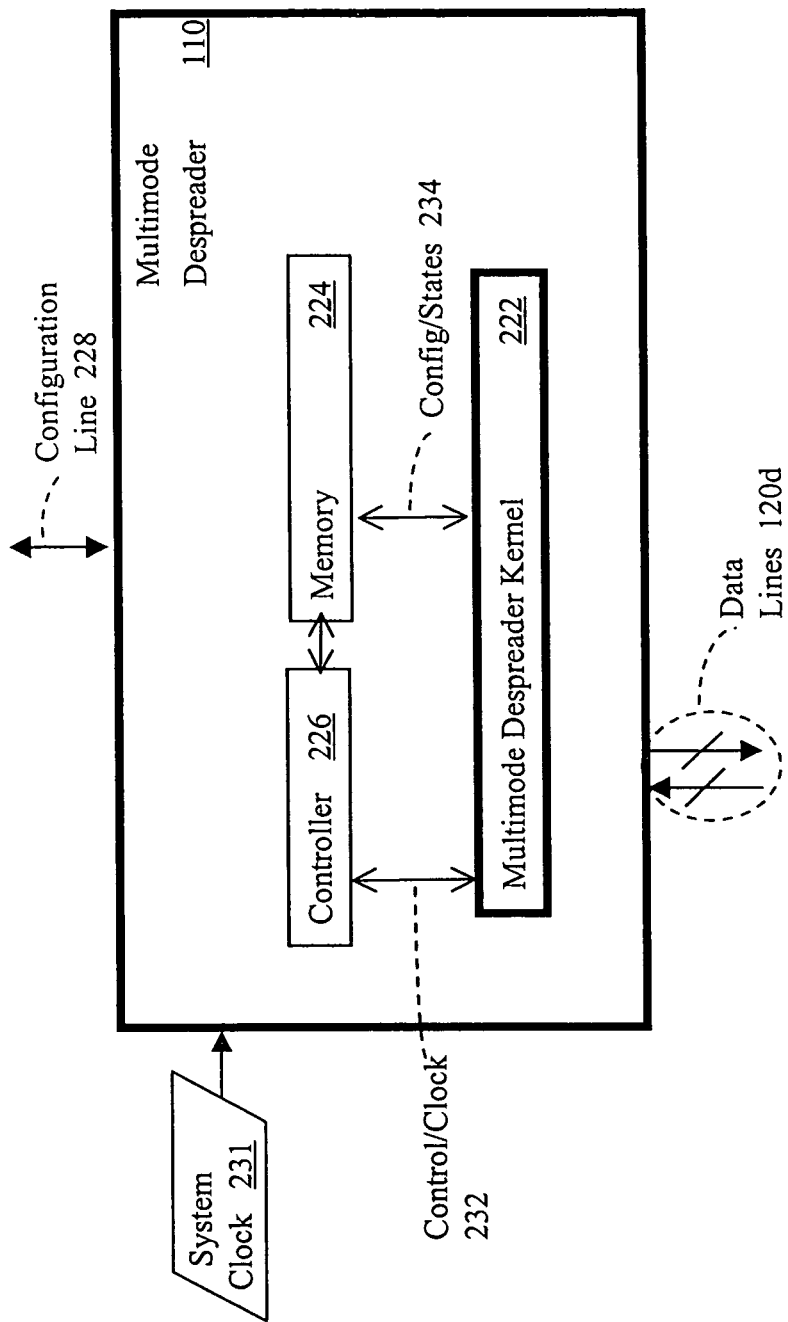
FIG. 2A is a block diagram of the major components in the multimode despreader, in accordance with one embodiment of the present invention.
Figure 2B:
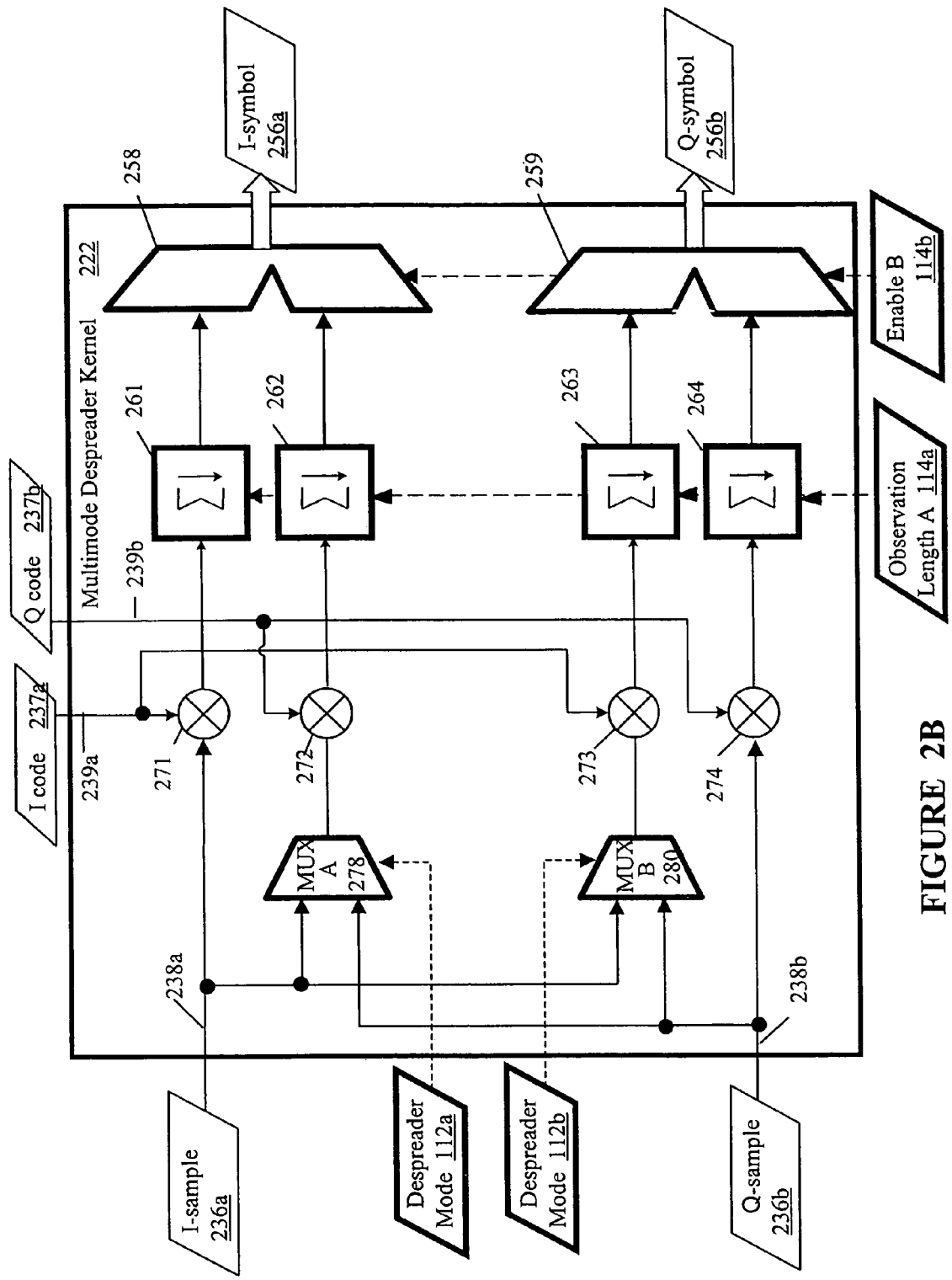
FIG. 2B is a block diagram of the multimode despreader hardware kernel, in accordance with one embodiment of the present invention.

Multimode despreader 110 despreads digital signals for the communication system in the present embodiment. Subsequent FIGS. 2A and 2B provide exemplary embodiments of multimode despreader 110. Communication device 100 is operable to receive inputs for configuring multimode despreader 110. As an example, the present embodiment receives an input of despreader mode 112 and an input of despreader observation lengths 114, whose functions are described in a subsequent flowchart. For example, despreader mode 112 can indicate whether the despread operations for the CDMA system utilizes IS-95 or 3GPP protocols, or whether the despread operation is for a WLAN. Mode information can include: 1) real or complex spreading (e.g., BPSK or QPSK spreading); 2) single or dual channel spreading; and 3) type of data modulation.

Despreader configuration inputs 112 and 114 to communication device 100a can be designed using a computing device that has a graphical user interface (GUI) with a library of functions that allow predetermined configuration options, in the present embodiment. Additionally, communication device 100a can receive the desired code generator configurations 124 via a variety of embodiments. For example, in one embodiment, configuration information is received via wired communications with a computing device, e.g., a workstation. In another embodiment, configuration information can be provided by an electronic storage medium, e.g., CD-ROM. In yet another embodiment, configuration information is received by wireless transmission from another communication device via antenna 101. Furthermore, configuration information is provided at the time communication device 100a is manufactured and/or initially programmed for operation in the field, in the present embodiment. However, in another embodiment, configuration information is dynamically implemented at a time when communication device 100a is in operation in the field. Configuration information is received, processed, and implemented via controller 130 and memory 120, which then communicate the information and instructions via bus 117 to base band processors 106. Within baseband processor 106a-106n, local memory 224, and local controller 226 of FIG. 2A, can control implementation of configuration information to, and operation of, despreader kernel 222 in the present embodiment. Local controller 226 can provide local control signals for initiation, reset, and interrupt for despreader kernel 222, as well as scaled clock rates.

CGS 114a is a hardware computation resource that can be applied to a single computation process, e.g., a multipath of a given channel, in one embodiment. However, in another embodiment, the computation resource provided by CGS 114a can be enhanced by running CGS 114a at a clock rate higher than that required by a process, e.g., higher than the data rate for a communication protocol. In this manner, resources of individual computation components, such as CGS 114a, can be time-shared across multiple computation processes, e.g., several multipaths and/or multiple channels. Additional information on the design and implementation of configurations into a configurable communication device is provided in co-pending U.S. patent application Ser. No. 09/492,634 entitled "IMPROVED APPARATUS AND METHOD FOR MULTI-THREADED SIGNAL PROCESS- ING" by Subramanian et al. This related application is commonly assigned, and is hereby incorporated by reference.

While communication device 100 provides a specific quantity of components that are arranged in a specific configuration, the present invention is well suited to a wide range of alternatives. For example, multimode despreader 110 can be coupled in between CMF 107 and multipath estimator 108 in one embodiment. In this embodiment, a detector can be coupled to multimode despreader 110 in parallel with multipath estimator 108. Communication device 100 is adaptable to many wireless systems and capable of implementing many different types of communication protocols, as will be described hereinafter. In another embodiment of communication device 100, multiple versions of multimode despreader plane 110 can be coupled in parallel to CMF 107. Additionally, in lieu of CGU 109, despreading codes can be provided from look up tables located in memory, e.g., system memory 120 of FIG. 1, or in local memory 224 of FIG. 2A. Signals provided by front-end processing block 103 to base band processing block 106 are complex, e.g., having an in-phase and a quadrature-phase signal.

Multimode Despreader

Referring now to FIG. 2A, a block diagram of the major components in a multimode despreader are shown, in accordance with one embodiment of the present invention. Multimode despreader 110 includes a local controller 226, a multimode despreader kernel 222, and a memory block 224 in the present embodiment. Multimode despreader kernel 222 is a satellite kernel, which is algorithmic-specific in the present embodiment. That is, while despreader kernel 222 is a configurable electronic device capable of performing a wide range of algorithms, the algorithms are nonetheless limited to the class of despreading functions. An exemplary description of a multimode despreader kernel 222 is described in subsequent FIG. 2B.

Input/output data lines 120d are coupled to multimode despreader 110 to provide data transfer, in the present embodiment. Input/output (I/O) data lines 120d are implemented as separate lines 120a-120c of FIG. 1 in the present embodiment, but can also be implemented in a bus in another embodiment. In particular, input/output data lines 120d provide data streams to and from multimode despreader kernel 222 with respect to other kernels or components in the communication device. Local controller 226 provides control to multimode despreader kernel 222 to enable data transfer with minimal input from a global controller, e.g., controller 130 of FIG. 1. The communication mechanism between each kernel is dataflow driven in the present embodiment.

Controller 226 is a state machine with memory, in the present embodiment, capable of controlling multimode despreader kernel 222. In another embodiment, controller 226 includes memory that is capable of preserving state conditions of at least one configuration of multimode despreader kernel 222. Multimode despreader 110 uses a distributed control and configuration via local controller 226, which effectively reduces overhead in terms of instruction fetch and global control. Multimode despreader 110 receives system clock input 231. Controller 226 and memory 224 are coupled to receive configuration information from configuration line 228. In one embodiment, configuration information is passed to configuration line 228 from line 119 in communication system 100 of FIG. 1. In one embodiment local controller 226 scales system clock input 231 to a desired local clock rate for multimode despreader kernel 222. Local clock scaling allows operation of multimode despreader kernel 222 at higher rates than the system clock. This allows for time-sliced architecture discussed hereinabove. Control/clock line 232 provides scaled clock signals, and provides control signals to, and receives status signals from, multimode despreader kernel 222.

Memory block 224 is random access memory (RAM), register file, or combination thereof, for storing data, instructions, states, and/or configuration information for controller 226 and/or multimode despreader kernel 222, in the present embodiment. Memory block 224 is coupled to receive configuration information, e.g., despreader mode 112 and despreader observation length 114 of FIG. 1, via configuration line 228. Memory block 224 includes both static registers, which are fixed at initialization, and dynamic registers, which can be updated internally and on the fly by other components within a communication device, e.g., local controller 226. Memory 224 passes configuration and state information to multimode despreader kernel 222 via interconnect 234.

By having local memory block 224 and local controller 226, multimode despreader 110 is an autonomous device in the present embodiment. This arrangement provides a very quick and efficient changing of configuration data for algorithmic satellite kernel, or multimode despreader kernel, 222. Therefore, time-sharing of a hardware kernel is feasible and practical.

Multimode despreader kernel 222 implements a unique combination of reconfigurable logic, reconfigurable datapath, reconfigurable dataflow, and reconfigurable logic, in an architecture referred to as Dynamically Reconfigurable Logic (DRL). Thus, multimode despreader kernel 222 provides a flexible architecture in an autonomously controlled configurable hardware kernel for the narrow scope of a despreader algorithm. This configuration efficiently allocates the most flexible reconfiguration resources as needed within the class of despreader algorithms. By doing so, this architecture efficiently delivers a class of millions of operations per second (MOPS) with flexibility in the configuration of these MOPS and scalability across data rates and channel densities. Subsequent FIG. 2B provides an exemplary embodiment of the DRL architecture for multimode despreader kernel 222.

Multimode despreader 110 of FIG. 2A is well suited to alternative embodiments. For example, system controller can provide control functions to multimode despreader kernel 222, thus eliminating local controller 226. In another alternative, memory block 224 can be any form of memory, such as registers, flash memory, etc. In yet another embodiment, multimode despreader kernel 222 is implemented without a local controller 226 and local memory 224, in communication device 100 of FIG. 1A.

Referring now to FIG. 2B, a block diagram of the multimode despreader hardware kernel is shown, in accordance with one embodiment of the present invention. Multimode despreader kernel 222 provides an exemplary despreader engine for multimode despreader 110 and for communication device 100. In the present embodiment, despreader kernel 222 can despread any code sequence and any data sequence, given the appropriate configuration instructions. The devices shown in FIG. 2B are multi-bit wide devices in the present embodiment, e.g., for performing multiply, accumulate, and sum operations on multi-bit entities, e.g., a bit word of any length.

Multimode despreader 222 has two inputs for a receiving multiple input data classes. If a received signal is complex, then the input data classes include an in-phase portion of the data channel that can be received as input I-sample 236a on an I-sample line 238a and a quadrature-phase portion of the data channel can be received as input Q-sample 236b on a Q-sample line 238b. Multimode despreader 222 also has two possible inputs for a code sequence. If a received code sequence is complex, then an in-phase portion of the code sequence can be received as input 237a I-code, and a quadrature-phase portion of the code sequence can be received as input Q-code 237b. Inputs I-code 237a and Q-code 237b are multi-bit, or multi-chip, length code samples that correspond in length to the samples provided for I-sample 236a and Q-sample 236b, in the present embodiment. However, I-code 237a and Q-code 237b can also be single bit length samples.

Multimode despreader kernel 222 includes multiple multiplier-logic devices 271-274, which are coupled to a respective one of multiple accumulate and dump circuits 261-264. Multiplier-logic device 271 is coupled to I-sample line 238a and to I-code line 239a, while multiplier-logic device 272 is coupled to MUX A 278 and to Q-code input line 239b. Similarly, multiplier logic device 273 is coupled to MUX B 280 and to I-code input line 239a, while multiplier logic device 274 is coupled to Q-sample line 238b and to Q-code line 239b. The top pair of accumulate and dump circuits 261 and 262, are coupled to one interface circuit 258, while a bottom pair of accumulate and dump circuits 263-264 are coupled to another interface circuit 259 to provide an output of Q-symbol 256b. Multiplier-logic devices 271-274 are OR gates in the present configuration for single-bit arithmetic.

Still referring to FIG. 2B, multimode despreader 222 also includes two selective couplers for selectively mixing data input with code input. In the present embodiment, the selective couplers include multiplexer (MUX) A 278 and MUX B 280, which are both coupled to both the I-sample input line 238a and the Q-sample input line 238b. Mux A 278 and Mux B 280 also receive a configuration instruction 112a and 112b respectively, that indicates whether I-sample input 236a or Q-sample input 236b will be communicated to multiplier 272 and 274, respectively. In this manner, multimode despreader kernel provides all needed permutations of code and data mixing for a communication system. Despreader mode input 112a and 112b can be values stored in local memory 224 of FIG. 2A, or in system memory 120 of FIG. 1. By having selective couplers in multimode despreader, 222, the present invention does not need to duplicate common elements used across multiple varied despreading protocols for varied wireless applications and to future generations of despreading protocols. Rather, the present invention solves these limitations with an efficient quantity of computing resources and with an adequate amount of reconfigurability, e.g., as appropriate for the class of despreading and dechannelization functions.

In the present invention, accumulate and dump circuits 261-264 have a configurable observation period (e.g., a measure of time or cycles over which input values are cumulatively summed). An input of a observation length A 114a is provided to all accumulate and dump circuits 261-264 to implement a variable observation period. An exemplary configuration of an accumulate and dump circuit is provided in FIG. 3 hereinafter. Interface circuits 258 and 259 are enabled by input B 114b to receive a real and imaginary input signal from accumulate and dump circuits 261 and 262, and accumulate and dump circuits 263 and 264, respectively. Interfaces 258 and 259 then communicate a complex signal out, as I-symbol 256a and Q-symbol 256b, respectively.

Observation length A 114a input can be a value stored in local memory 224 of FIG. 2A, or in system memory 120 of FIG. 1. By providing variable accumulation lengths in accumulate and dump circuits 261-264, the present invention provides a tool to overcome the limitations of noise interference and signal impairment in a despreading operation. In particular, the present invention provides a despreader that can adapt to variations in the noise level of a signal under different operating environments.

While specific components and coupling arrangement of multimode despreader kernel 222 are provided in FIG. 2B, the present invention is well suited to a wide range of alternatives. For example, in an alternative embodiment, accumulate and dump circuits 261-264 can be conventional accumulate and dump circuits with a preset non-configurable integration length. Similarly, another embodiment implements multiplier-logic devices 271-274 accommodate multiple-bit arithmetic, e.g., 2-input XOR gate for two-bit arithmetic. In yet another embodiment, multimode despreader kernel 222 is not configurable and thus, MUX A 278 and MUX B 280 are not needed. In this latter embodiment, multimode despreader 222 still implements a variable observation length using accumulate and dump circuits 261-264 and variable interface circuits 258-259. In an alternative embodiment for multimode despreader kernel 222, the devices shown are single-bit wide devices that perform their functions on one bit wide inputs.

Multipliers 271-274 perform the same function for any of multiple configurations of the multimode despreader kernel. Hence, they can be referred to as a fixed group of devices. In contrast, multiplexer MUX A 278 and MUX B 280 can provide different inputs to multipliers 272 and 273 respectively. Similarly, accumulate and dump circuits 261-264 are configurable to provide different integration lengths. As a result, the multiplexers and the accumulate and dump circuits can be categorized as a flexible group of devices. Thus, multimode despreader kernel 222 has an architecture that is tuned to its intended class of despreader functions.

Figure 3:
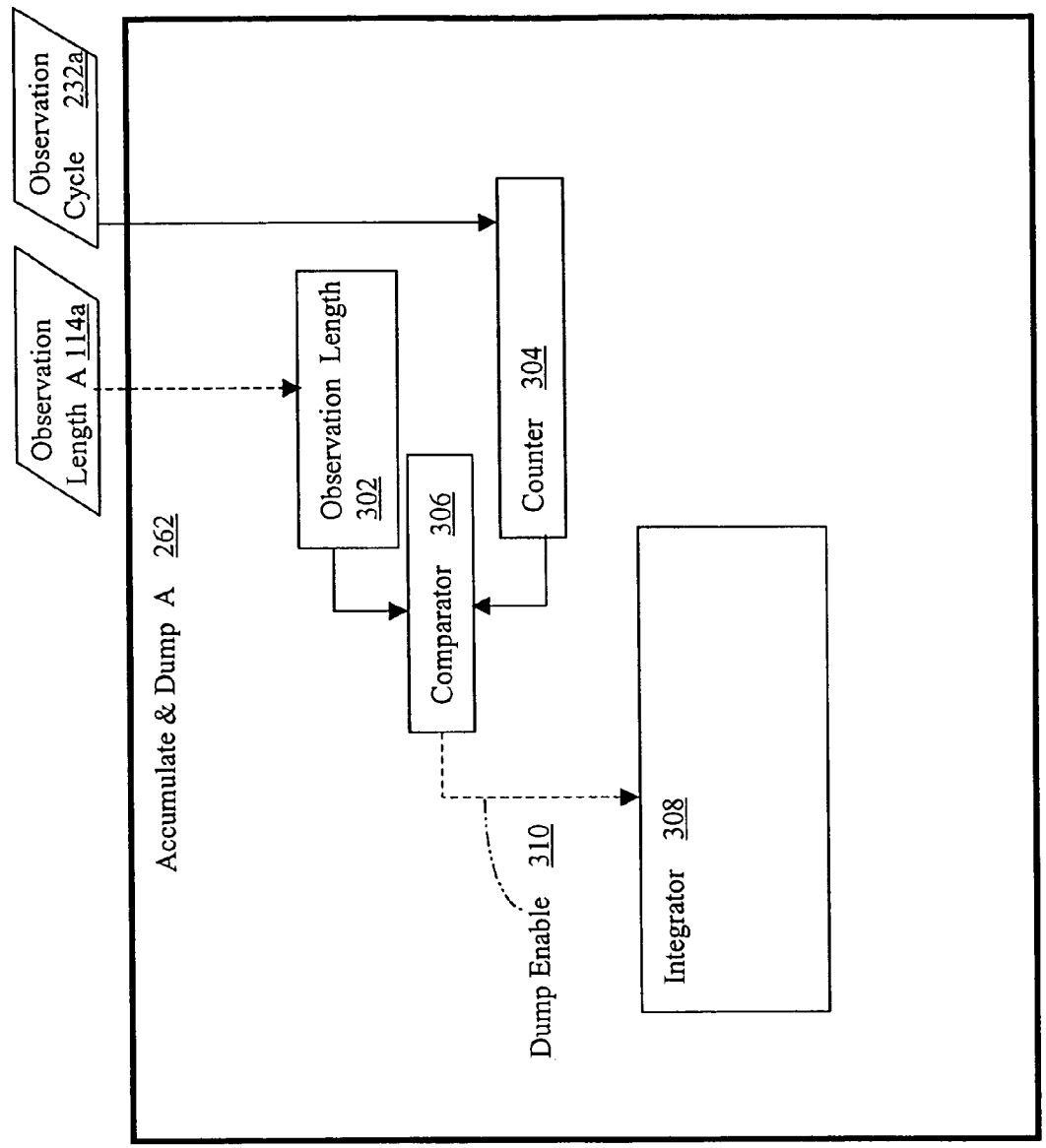
FIG. 3 is a block diagram of a variable accumulate and dump circuit, in accordance with one embodiment of the present invention.
Figure 4:
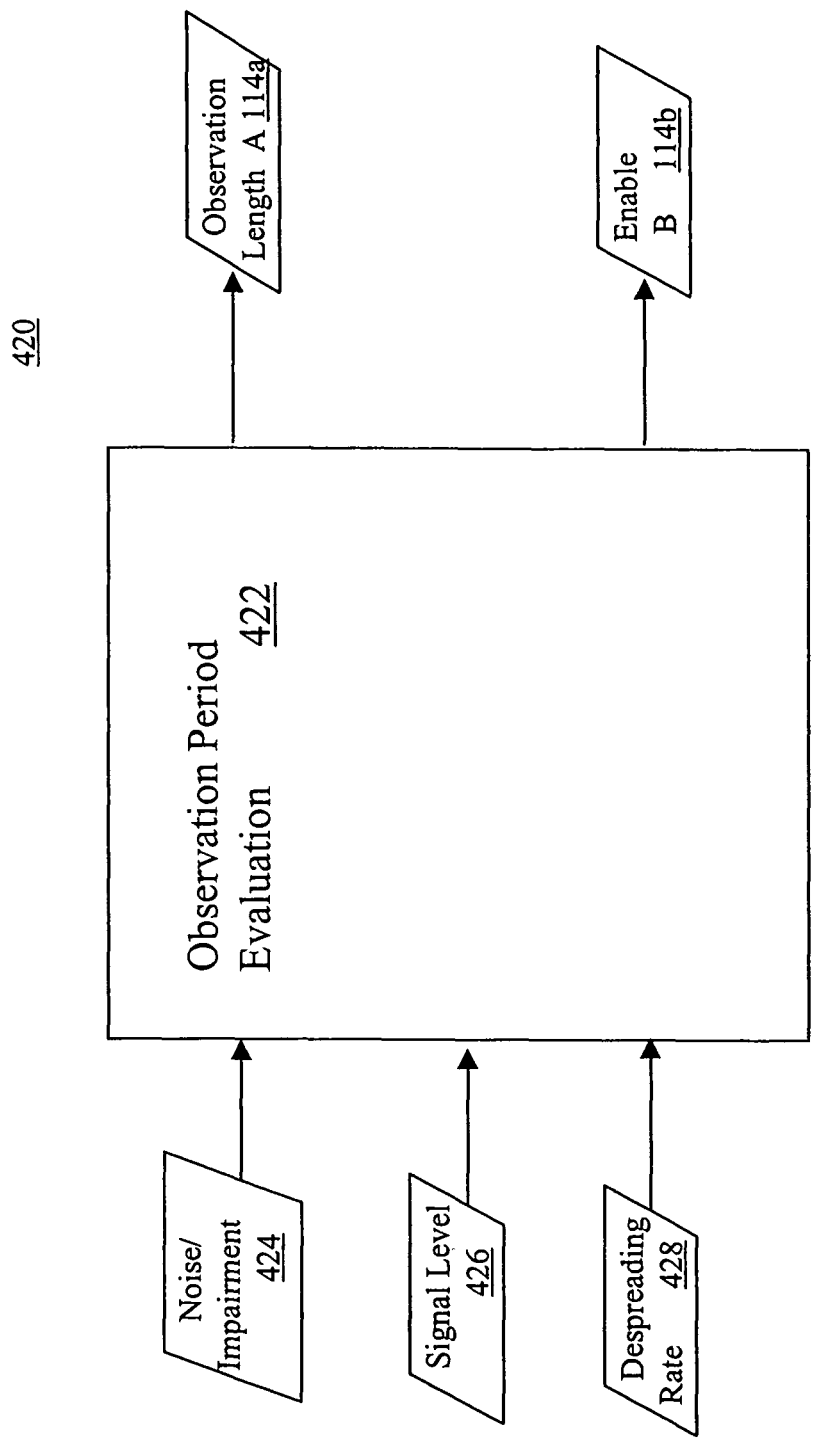
FIG. 4 is a block diagram of a function providing observation period for the multimode despreader, in accordance with one embodiment of the present invention.

Referring now to FIG. 3, a block diagram of a variable accumulate and dump circuit is shown, in accordance with one embodiment of the present invention. Exemplary variable accumulate and dump circuit of FIG. 3 can be incorporated into one or more of accumulate and dump circuits 261-264 of FIG. 2B. Variable accumulate and dump circuit 262 provides a circuit with a configurable observation length over which observations can be accumulated.

Variable accumulate and dump circuit 262 includes a comparator 306 coupled to an integrator 308 via a dump enable line 310. Variable accumulate and dump circuit 262 also includes a counter 304 and an observation length memory register 302, coupled to the comparator 306. Observation length block 302 is memory in the present embodiment that receives observation length A 114a input, while the counter 304 receives an indication of how many observations have been accumulated in accumulate and dump circuit 262. It is appreciated that comparator 306, counter 304, dump length block 302 and integrator 308 have a construction and operation that is known to one skilled in the art.

The present invention is well suited to alternative embodiments from those presented in FIG. 3. For example, comparator operation can be performed by local controller 226 of FIG. 2A in lieu of a separate device 306 in FIG. 3. Similarly, observation length A memory 302 can be implemented within local memory 224 of FIG. 2A or in system memory 120 of FIG. 1. Alternatively, comparison circuitry can be a separate circuit from accumulate and dump circuits 261-264. In this embodiment, separate comparison circuitry can provide an enable signal to all accumulate and dump circuits 261-264.

Referring to FIG. 4, a block diagram 420 of a function providing observation (or integration) length A and enable B for the multimode despreader is shown, in accordance with one embodiment of the present invention. Block diagram 420 enables dynamic and adaptive operation of exemplary multimode despreader hardware 222 shown in FIGS. 2A and 2B.

Observation period evaluation block 422 receives inputs on which observation period may be determined. In the present embodiment, the inputs include an input noise and signal impairment level 424, an input signal level 426, and an input of despreading rate 428. In the present embodiment, input noise and signal impairment level 424 is provided by multipath estimator 108 of FIG. 1. Other inputs such as frequency offsets can also be evaluated by the present invention. Observation period evaluation block 422 evaluates these inputs in view of the tradeoff of observation period with noise levels and signal impairment, as shown in FIG. 4. Observation period evaluation block 422 also evaluates the despreading rate required for a signal, e.g., the rate at which a data signal was spread at a transmitter. If the despreading rate is slower than a locally generated clock in programmable multimode despreader, e.g., via clock line 232 of FIG. 2A, then the observation length can be increased. Input of despreading rate 428 is tied to the chip rate at which a data signal is transmitted. For example, the integration lengths can be proportionally varied for a data signal transmitted at 1.2288 MHZ, e.g., 1.2288 Mbps, versus a data signal transmitted at a rate of 348 Kbps.

Observation period evaluation block 422 provides an output of observation length A 114a, which dictates the observation length implemented by accumulate and dump circuit 262. Observation period evaluation block 422 can also provide an output of enable B 114b, which occurs after the observations have been dumped. The choice of observation length A 114a effects the performance of the despreader by choosing the length or size of the sample, e.g., I-symbol 256a and Q-symbol 256b, output from FIG. 2B. Thus, short observation periods can have a different effect on the signal to noise ratio (SNR) than long observation periods. Simulation tests can be utilized to determine an appropriate observation period for different input conditions, e.g., of impairments and noise level 424 and signal level 426. Short observation periods have an effect of providing small samples of data, e.g., X(a), and noise, e.g., N(a), from despreader 222 which can then be squared and added by subsequent operations performed in function block 116 of FIG. 1. Equation [1] provides an exemplary representation of this embodiment. Alternatively, longer observation periods have an effect of summing larger samples of data, e.g., X(a), and noise, e.g., N(a), in despreader 222 before communicating them to be squared by subsequent operations performed in function block 116 of FIG. 1. Equation [2] provides an exemplary representation of this embodiment.

$$\Sigma[(X^2(a)+N^2(a))] \quad [1]$$

$$\Sigma[(X(a)+N((a))]^2 \quad [2]$$

In one embodiment, observation period evaluation block 422 is implemented using a look up table (LUT) having a wide range of integration lengths. The LUT is located in system memory 120 and implemented by system controller 130 of FIG. 1 in one embodiment, and located in local memory 224 and implemented by local controller 226 of FIG. 2A in another embodiment. Alternatively, the observation period evaluation block 422 can be implemented as an algorithm that is implemented by processor 226 and memory 224 of FIG. 2A. The observation period evaluation block 422 can be implemented by a proprietary, user-specific algorithm or a value that is determined a priori, and communicated to configurable communication device 100 of FIG. 1 as input despreader length 114.

The present invention is well suited to alternatives other than those presented in function block diagram 420. For example, observation period evaluation block 422 can provide a binary choice of either a single long integration length versus a single short integration length, in an alternative embodiment. Additionally, other inputs may be provided to observation period evaluation block 422 for purposes of determining accumulation lengths in multimode despreader. This latter embodiment can be implemented using comparative circuitry having threshold value for choosing either the long integration length or the short integration length.

Processes

Figure 5A:
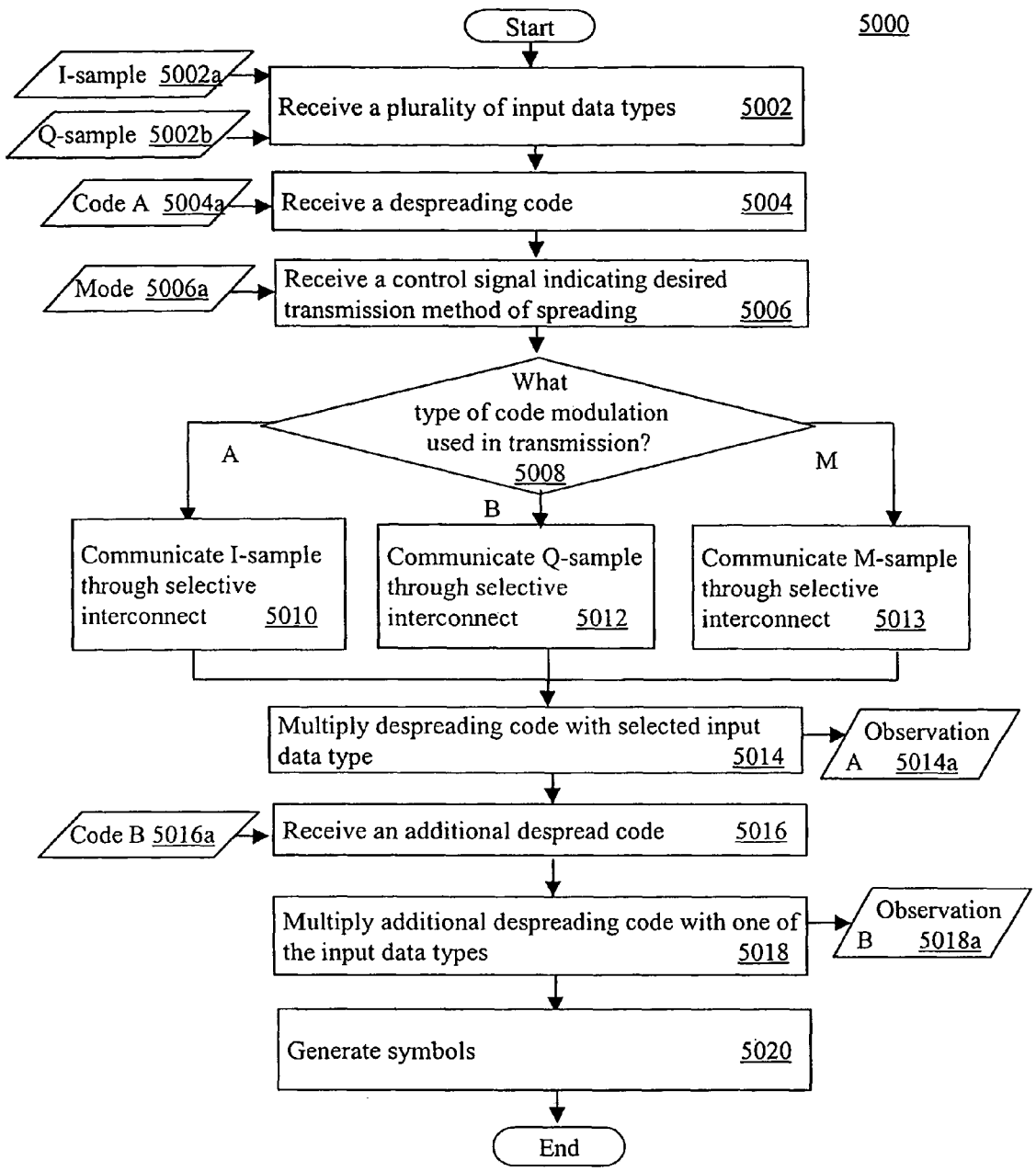
FIG. 5A is a flowchart of the process used to operate a despreader having multiple modes of operation, in accordance with one embodiment of the present invention.

Referring now to FIG. 5A, a flowchart of the process used to operate a despreader having multiple modes of operation is shown, in accordance with one embodiment of the present invention. Flowchart 5000 is implemented, in the present embodiment, using exemplary block diagrams of FIGS. 1, 2A-2B, and 3. However, flowchart 5000 is only applied to half the multimode despreader for purposes of clarity, the other half of multimode despreader being complementary. Flowchart 5000 can effectively be used to despread input data having a wide range of modulation schemes in conjunction with a wide range of spreading modulation schemes. By using the present flowchart embodiment, the present invention provides a method of accommodating a wide range of spread spectrum communication applications and protocols.

Flowchart 5000 begins with step 5002. In step 5002 of the present embodiment, a plurality of input data types are received. In the present embodiment, input data types include a real portion 5002a and a quadrature-phase portion 5002b of an input data signal. Real portion is an in-phase sample (I-sample) of multiple bits while complex portion is a quadrature-phase (Q-phase) of multiple bits in the present embodiment. However, inputs 5002a and 5002b can be single bits in another embodiment, and can be M-ary phase inputs for 5002b. Step 5002 is implemented by received real and complex portions of input signal on an I-sample input line 238a and Q-sample input line 238b, respectively, of FIG. 2B. The present invention is well suited to using binary or m-ary versions of complex data signal modulation protocols. I-sample can also be referred to as RxData_I and Q-sample can be referred to as RxData_Q. Additionally, the input data types can also span the variations in signal timing, e.g., the data types can be on-time, early, or late versions of the input data.

Alternatively, the present invention is well suited to using only real modulation of a data signal. In this latter embodiment, the complex portion of the plurality of input data types can be ignored in subsequent processing or complex-signal hardware can be disabled. For example the present invention can despread any of the following exemplary forms of real data modulation a) pulse amplitude modulation (PAM); b) 2-PAM; c) 4-PAM; etc. Furthermore, the present invention can despread any of the following exemplary forms of complex data modulation: a) phase shift keying (PSK); b) binary phase shift keying (BPSK); c) quadrature-phase shift keying (QPSK); quadrature amplitude modulation (QAM), etc. Following step 5002, flowchart 5000 proceeds to step 5004.

In step 5004 of the present embodiment, a despreading code is received. In the present embodiment, despreading code A input 5004a is received at multimode despreader 222 shown in FIG. 2B in the form of Q-code 237b on Q-code input line 239b. However the present invention is well suited to receiving an alternate version of the despreading code, e.g., I-code 237a on I-code input line 239a. For example, the present invention is well-suited to utilizing the following exemplary despreading codes: a) long pseudonoise (PN) sequence; b) short PN sequence; c) Walsh codes; d) Kasami codes; e) Gold codes; f) m-sequences; g) orthogonal varying spreading factors (OVSF); h) BPSK/QPSK modulation for data or spreading code; and i) single or dual channel QPSK for spreading code; etc. Even user-specified coding schemes can be accommodated in the present invention. In particular, the real part of short code is utilized for IS-95, IS-2000, ARIB, or 3GPP cellular telephony systems. Similarly, the imaginary part of short code is utilized for IS-95, IS-2000, ARIB, or 3GPP. In contrast, specific versions of the long code are utilized for de-channelization, IS-2000 channelization codes, or 3GPP channelization codes. Thus, configurable multimode despreader 222 of FIG. 2B, when implemented per flowchart 5000, provides a multi-standard despreader/descrambler for cellular telephony that covers a wide variety of despreading methodologies. Following step 5004, flowchart 5000 proceeds to step 5006.

In step 5006 of the present embodiment, a control signal indicating the desired despreading transmission method-is received. In the present embodiment, the control signal is received at a selective coupler, implemented as a multiplexer (MUX) A 278 of FIG. 2B. MUX A 278 is coupled to input lines 238a and 238b to receive the plurality of input data types, e.g., I-sample input 236a and Q-sample input 236b respectively. Control signal is provided in the present embodiment by despreader mode input 112a and 112b as shown in FIG. 2B. Control input is programmed into multimode despreader a priori as determined by a user for a given application, in the present embodiment. Following step 5006, flowchart 5000 proceeds to step 5008.

In step 5008 of the present embodiment, an inquiry determines whether the desired transmission uses an 'A' method, 'B' method, or 'M' method of code modulation for spreading a signal. These methods can be any desired type of code modulation. For example, 'A' method of code modulation modulates only the real portion of a signal, while the 'B' method modulates a real and complex portion of the signal, and 'M' method utilizes M-ary code modulation, in the present embodiment. M-ary code modulation refers to communicating using M symbols such as a binary case with M=2, a quaternary case with M=4, etc.

In the present embodiment, a control signal of despreader mode input 112a is provided to MUX A 278 to implement the portion of the data signal for despreading steps that are appropriate for the spreading method used in transmission. Step 5008 provides the logic for implementing a desired despreading protocol from the multiple possible despreading combinations.

Step 5010 arises if the transmission method uses the 'A' method of code modulation for spreading a signal. In step 5010 of the present embodiment, the real portion of the data signal is provided for subsequent despreading operations. Step 5010 is implemented by communicating I-sample input 236a, and by not communicating Q-sample input 236b, through MUX A 278, as shown in FIG. 2B. Following step 5010, flowchart 5000 proceeds to step 5014.

Step 5012 arises if the transmission method uses the 'B' method of code modulation for spreading a signal. In step 5012 of the present embodiment, a quadrature portion of the data signal is provided for subsequent despreading operations. Step 5012 is implemented by communicating Q-sample input 236b, and by not communicating I-sample input 236a, through MUX A 278, as shown in FIG. 2B. Following step 5012, flowchart 5000 proceeds to step 5014.

Step 5013 arises if the transmission method uses the 'M' method of code modulation for spreading a signal. In step 5013 of the present embodiment, a M-phase portion of the data signal being provided for subsequent despreading operations. Step 5013 is implemented by communicating an M-sample input 236b, and by not communicating I-sample input 236a, through MUX A 278, as shown in FIG. 2B. Following step 5013, flowchart 5000 proceeds to step 5014.

In step 5014 of the present embodiment, the despreading code is multiplied by the selected input data type identified in steps 5008-5012. Step 5014 is implemented in the present embodiment, by multiplier 272 of FIG. 2B selectively multiplying either the I-sample or the Q-sample times the despreading code. The multiplication operation produces a product output 5014a that is referred to as an 'observation.' Step 5014 is represented mathematically as: I-sample*Q-code for step 5010, while 5014 is represented mathematically as: Q-sample*Q-code for step 5012. Again, the specific choice of products in 5014 is determined by the transmission method for spreading, which is determined a priori. Multiplication operation steps can be implemented as correlation operations or pipeline correlation operations. Following step 5014, flowchart 5000 proceeds to step 5018.

Step 5016 of the present embodiment receives an additional despread code is. In particular, code 'B' input 5016a is received for despreading. Step 5016 provides for a complex methodology of despreading. That is, step 5016 is implemented in the present embodiment by receiving a real, or in-phase, despreading code sequence I-code 237a, as shown in FIG. 2B. Following step 5016, flowchart 5000 proceeds to step 5018.

In step 5018 of the present embodiment, the additional despreading code is multiplied by one of the additional input data types. Step 5018 is implemented in the present embodiment by multiplier 271 of FIG. 2B. In particular, multiplier 271 multiplies I-sample input 236a by I-code 237a. Step 5018 accounts for a common despreading operation that is consistent across the class of protocols accommodated by the present invention. Consequently, steps 5016-5018 do not provide any selective coupling arrangements as all despreading protocols include a step of despreading a real portion of the data signal by a real despreading sequence. Steps 5018 and 5014 essentially occur in parallel in the present embodiment. Following step 5018, flowchart 5000 proceeds to step 5020.

In step 5020 of the present embodiment, symbols are generated from the observations generated in steps 5014 and 5018. In one embodiment, step 5020 is implemented using known methods and apparatus, e.g., static interface and dump circuits. However, in another embodiment, the accumulate and dump and interface operations used to generate symbols for step 5020 can be implemented in a dynamic manner that tailors performance to noise levels in the signal. Flowchart 5100 provides an exemplary method for this latter embodiment, using exemplary programmable apparatus of FIGS. 1-3. Following step 5020, flowchart 5000 ends.

In the present embodiment, flowchart 5000 is implemented in a parallel and simultaneous manner for a set of code and input signal combinations complementary to the code and input signal combinations described in steps 5002-5020 hereinabove. Thus, in the parallel implementation MUX B 280 is utilized to selectively enable an I-sample input 236a or a Q-sample input 236b to be selectively communicated to a multiplier logic device 273. In a complementary manner, I-code 237a is provided to the same multiplier logic device 273. Similarly, a Q-code 237b and Q-sample 236b are provided to an additional multiplier logic device 274. The accumulate and sum step and the sum step are implemented for these two additional multiplier logic devices 273 and 274. The complementary code and input signal combination represent the complex portion of the input signal and the complex portion of the despreading code, summed by interface device 259 to produce a Q-symbol output 256b, as shown in FIG. 2B.

Figure 5B:
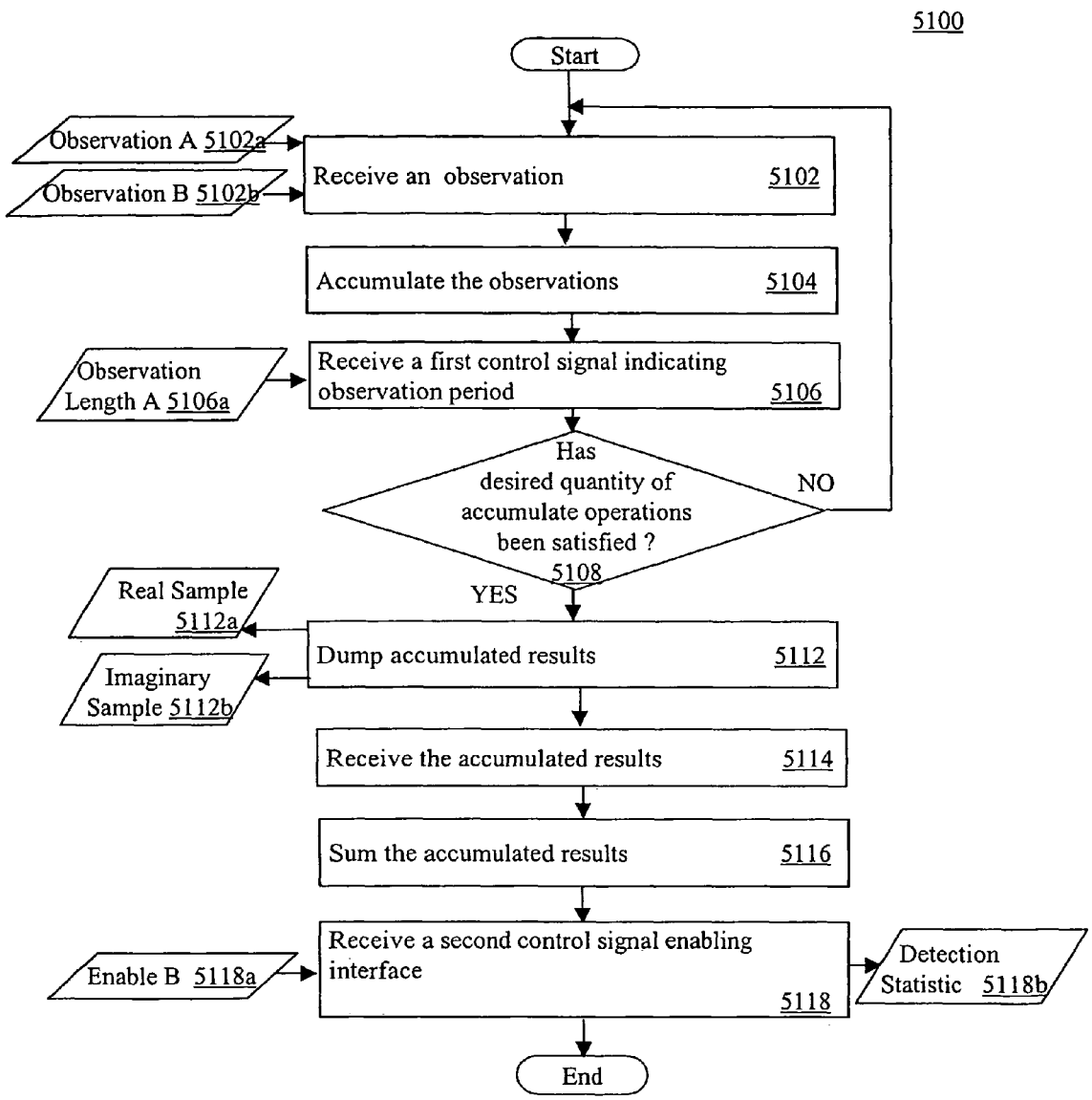
FIG. 5B is a flowchart of the process used to operate a despreader having variable observation period, in accordance with one embodiment of the present invention.

Referring now to FIG. 5B, a flowchart 5100 of the process used to operate a despreader having variable observation period is shown, in accordance with one embodiment of the present invention. Flowchart 5100 is implemented, in the present embodiment, using exemplary block diagrams of FIGS. 1, 2A-2B, and 3. However, flowchart 5100 is only applied to half the multimode despreader for purposes of clarity, with the other half of the multimode despreader being complementary. Flowchart 5100 provides exemplary steps to adaptively despread input data over a range of noise levels. By using the present flowchart embodiment, the present invention provides a despread data signal with better signal to noise ratios (SNR) for varying real-world environments than a system using a single integration length for despreading.

Flowchart 5100 begins with step 5102 in which, for the present embodiment, an observation is received. In particular, an observation A 5102a input is received for the (I-sample*I-code) product while observation B input 5102b is received for the (I-sample*Q-code) product or the (Q-sample*I-code) product, as dictated by the spreading used for transmission. Acquisition of observation A 5102a and observation B input 5102b is described in exemplary flowchart 5000. That is, outputs 5014a and 5018a of flowchart 5000 can be provided as inputs 5102a and 5102b in flowchart 5100, respectively. Step 5102 is implemented in the present embodiment by receiving observation A input 5102a at accumulate and dump circuit 261 and by receiving observation B input 5102b at accumulate and dump circuit 262 of multimode despreader device 222 of FIG. 2B. Following step 5102, flowchart 5100 proceeds to step 5104.

In step 5104 of the present embodiment, the observations received are accumulated. Accumulation step 5104 is one of the steps needed to recover the original source signal, as it existed prior to spreading in a transmitter device. Step 5104 is implemented by accumulation and dump circuits 261 and 262 of FIG. 2B. Step 5104 is represented mathematically as: $\Sigma[(\text{Observation A})]$ by accumulate and dump circuit 261, and as $\Sigma[(\text{Observation B})]$ by accumulate and dump circuit 262 of FIG. 2B. Both coherent and non-coherent accumulation modes can be supported in one embodiment. If a matched filter is utilized in communication system, e.g., system 100 of FIG. 1, then coherent or noncoherent accumulation can occur. If noncoherent accumulation is utilized, then the number of segments within the correlation interval can be specified. Following step 5104, flowchart 5100 proceeds to step 5106.

In step 5106 of the present embodiment, a first control signal for indicating the observation period over which accumulation step 5104 should operate is received. Step 5106 is implemented by accumulate and dump circuits 261-264 receiving an input of observation length A 114a as shown in FIG. 2B. Observation length A 114a is generated per the functional block diagram of FIG. 4B in the present embodiment. Following step 5106, flowchart 5100 proceeds to step 5108.

In step 5108 of the present embodiment, an inquiry determines whether a desired quantity of accumulate operations has been satisfied. If the desired quantity of accumulate operations has been satisfied, then flowchart 5100 proceeds to step 5112. However, if the desired quantity of accumulate operations has not been satisfied, then flowchart 5100 returns to step 5102, where the process is repeated. Step 5108 provides the logic for comparing the desired sample cycles with the actual cycles elapsed in a system. Step 5108 is implemented in one embodiment by the components of variable accumulate and dump circuit 262, via dump length block 302, counter 304 and comparator 306 of FIG. 3.

Step 5112 arises if the desired quantity of accumulate operations has been satisfied. In step 5112 of the present embodiment, the accumulated sample is dumped. This produces a result of accumulated A (or real sample) output 5112a, and accumulated B (or imaginary sample) output 5112b. Step 5112 is implemented by accumulate and dump circuits 261 and 262 of FIG. 2B dumping their accumulated result, as enabled in FIG. 3. It is appreciated that counter 304 and integrator 308 of FIG. 3 are reset following a dump operation per step 5112. Following step 5112, flowchart 5100 proceeds to step 5114.

In step 5114 of the present embodiment, the accumulated samples are received at an interface circuit. The accumulated results are the same values output by step 5112. Next, in step 5116 of the present embodiment, the received accumulated results are summed. Steps 5114 and 5116 are implemented by receiving the accumulated results from both accumulate and dump circuit 261 and 262 at interface circuit 258, then adding them together. Following steps 5114 and 5116, flowchart 5100 proceeds to step 5118.

In step 5118 of the present embodiment, a control signal enabling an interface to communicate the detection statistic is received. Step 5118 receives an input B 5118a to enable the step. Step 5118 is implemented by receiving enable input B input 114b at interface circuit 258 in FIG. 2B, thereby allowing it to output a complex detection statistic, referred to as I-symbol 256a. I-symbol 256a is subsequently provided to function block 116 for further processing operations, as shown in FIG. 1. In the present embodiment, FIG. 3 dictates the timing of enable B signal, which is dependent upon observation length A value in one embodiment. That is, enable input B 114b occurs after observation length A value 114a has enabled accumulate and dump circuits 261 and 262 to communicate real and imaginary dumped samples 5112a and 5112b to interface 258 in FIG. 2B. Thus, the present invention can adaptively update observation lengths for despreading dynamically with minimal lag in one embodiment. The dumped output from step 5118 is represented mathematically as:

$$\Sigma[(\text{Dumped Real sample+Dumped Imaginary sample})] \quad [3]$$

In equation [3], observation A was from accumulate and dump circuit 261 and observation B is from accumulate and dump circuit 262. Following step 5118, flowchart 5100 ends.

The groupings, or accumulation, of data from steps 5102 to 5118 and as implemented in multiplier circuits 271-274, accumulate and dump circuits 261-264, and interface circuits 258-259, can be classified in a hierarchical order. This hierarchical order can include any span of the following groupings. First, multiple individual chips can be grouped to form a symbol, and multiple symbols can be grouped to form a data field, and multiple data fields can be grouped to form a slot, and multiple slots can be grouped to form a frame. For example, N chips can equal M symbols which can equal L fields, where N>M>L, in one embodiment.

Table 1 provides an exemplary implementation where a received data sample and a received code sample (C) are repeated for two iterations for every observation (Obs.). Table 1 also indicates how a first accumulate operation occurs for length A of two observations; and how a second accumulate operation occurs for length B of two accumulate A results. In contrast, Table 2 provides a different example of accumulation operations. The present invention is well suited to a wide range of such hierarchical and configurable length accumulate operations.

TABLE 1

Hierarchy of accumulation operations

| Accumulate B | | | | | | | |
|---|---|---|---|---|---|---|---|
| Accumulate A | | | | Accumulate A | | | |
| Obs | | Obs | | Obs | | Obs | |
| C | C | C | C | C | C | C | C |

TABLE 2

Alternative hierarchy of accumulation operations

| Accumulate B' | | | | | | | | | | | | | | |
|---|---|---|---|---|---|---|---|---|---|---|---|---|---|---|
| Accumulate A' | | | | | | | Accumulate A' | | | | | | | |
| Observation | | | | Observation | | | | Observation | | | | Observation | | |
| C | C | C | C | C | C | C | C | C | C | C | C | C | C | C |

In the present embodiment, Flowchart 5100 is parallely implemented for a set of code and input signal products complementary to the set of code and input signal products implemented by steps 5102-5118 hereinabove. Thus, in the parallel implementation, accumulate and dump circuits 263 and 264 receive, accumulate, and dump the observation products from multiplier 273 and 274, per observation length A 114*a*, as shown in FIG. 2B. In a complementary manner, these products are communicated from interface circuit 259, per enable B 114*b*, to produce a Q-symbol output 256*b*.

While flowchart 5000 of the present embodiment shows a specific sequence and quantity of steps, the present invention is suitable to alternative embodiments. For example, not all the steps provided in flowcharts 5000 are required in alternative embodiments of the present invention. For example, step 5016 is not required for a despreader protocol that only utilizes real despreading codes. However, in an alternative embodiment, the parallel comparison step is not needed because it is replaced by a single comparison operation. Furthermore, the present invention is well suited to incorporating additional steps to those presented, as required by an application, or as desired for permutations in the process. Finally, the sequence of the steps for flowcharts 5000 and 5100 can be modified depending upon the application. Thus, while flowchart 5000 and 5100 are shown as a single serial process, it can also be implemented as a continuous or parallel process. For example, is appreciated that flowchart 5000 can be repeated for each of multiple instances of a multimode despreader within a communication device, e.g., device 100.

Many of the instructions for the steps, and the data input and output from the steps, of flowcharts 5000 and 5100 utilize searcher hardware and/or memory and processor hardware components, e.g. memory 120 and processor 110 of FIG. 1. Memory storage enabling any of the flowchart steps in the present embodiment can either be permanent, such as read only memory (ROM), or temporary memory such as random access memory (RAM) or a register file. Similarly, the processor used to implement any of the flowchart steps can either be a dedicated controller, an existing system processor, or it can be a dedicated digital signal processing (DSP) processor, as appropriate for the type of step. Alternatively, the steps of the present flowchart may be implemented using some form of a state machine.

Some portions of the detailed description, e.g., the processes, are presented in terms of procedures, logic blocks, processing, and other symbolic representations of operations on data bits within a computer or digital system memory or on signals within a communication device. These descriptions and representations are the means used by those skilled in the digital communication arts to most effectively convey the substance of their work to others skilled in the art. A procedure, logic block, process, etc., is herein, and generally, conceived to be a self-consistent sequence of steps or instructions leading to a desired result. The steps are those requiring physical manipulations of physical quantities. Usually, though not necessarily, these physical manipulations take the form of electrical or magnetic signals capable of being stored, transferred, combined, compared, and otherwise manipulated in a communication device or a processor. For reasons of convenience, and with reference to common usage, these signals are referred to as bits, chips, values, elements, symbols, characters, terms, numbers, or the like with reference to the present invention.

It should be borne in mind, however, that all of these terms are to be interpreted as referencing physical manipulations and quantities and are merely convenient labels to be interpreted further in view of terms commonly used in the art. Unless specifically stated otherwise as apparent from the following discussions, it is understood that throughout discussions of the present invention, terms such as "receiving," "communicating," "multiplying," "accumulating," "repeating," "dumping," "adding," "accepting," or the like, refer to the action and processes of a communication device or a similar electronic computation device, that manipulates and transforms data. The data is represented as physical (electronic) quantities within the communication devices components, and is transformed into other data similarly represented as physical quantities within the communication device components, or computer system memories or registers, or other such information storage, transmission or display devices.

In view of the embodiments presented herein, the present invention effectively provides a solution to the limitations of varied hardware, software, and methodology of despreading digital signals in each of the varied wireless applications. And the present invention provides a solution to conventional limitations of backward and forward compatibility associated with new generations of despreading protocols, hardware, and infrastructure within any of the varied wireless applications. Furthermore, the present invention provides alternatives to the limitations of noise interference with despreading. The present invention does so while addressing variations in the noise level of a signal under different operating environments.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

I claim:

1. A multi-mode despreader for despreading a received data signal, the despreader comprising:
    an input configured to supply real and phase shifted components of a despreading code in parallel;
    a first selector configured to select one of real and phase shifted components of the data signal;
    a second selector, coupled in parallel with the first selector, and configured to select one of the real and phase shifted components of the data signal;
    a first modulator configured to modulate the first selected one of the real and phase shifted components of the data signal with the phase shifted component of the despreading code; and
    a second modulator configured to modulate the second selected one of the real and phase shifted components of the data signal with the real component of the despreading code.

2. The multi-mode despreader as claimed in claim 1, wherein said each of said first modulator and second modulator comprises a multiplier.

3. The multi-mode despreader as claimed in claim 1, further comprising:
    a first sampler configured to take an observation sample of the output of said first modulator; and
    a second sampler configured to take an observation sample of the output of said second modulator.

4. The multi-mode despreader as claimed in claim 3, wherein said first and second samplers are further configured to operate for a predetermined number of cycles with a respective sample being taken for each cycle; and further comprising:
    a first accumulator configured to accumulate the observation samples of the first sampler over the predetermined number of cycles; and
    a second accumulator configured to accumulate the observation samples of the second sampler over the predetermined number of cycles.

5. The multi-mode despreader as claimed in claim 1, further comprising:
    a third modulator configured to modulate the real component of the data signal with the real component of the despreading code; and
    a fourth modulator configured to modulate the phase-shifted component of the data signal with the phase-shifted component of the despreading code.

* * * * *